United States Patent
Noutsis

(10) Patent No.: US 11,524,250 B1
(45) Date of Patent: Dec. 13, 2022

(54) FLUID WASTE FILTRATION SYSTEM WITH GREASE AND GARBAGE TRAPS

(71) Applicant: Photios Noutsis, Farmingville, NY (US)

(72) Inventor: Photios Noutsis, Farmingville, NY (US)

(*) Notice: Subject to any disclaimer, the term of this patent is extended or adjusted under 35 U.S.C. 154(b) by 0 days.

(21) Appl. No.: 17/706,937

(22) Filed: Mar. 29, 2022

(51) Int. Cl.
| | |
|---|---|
| E03F 5/16 | (2006.01) |
| B01D 17/02 | (2006.01) |
| C02F 1/40 | (2006.01) |
| B01D 21/00 | (2006.01) |
| C02F 101/32 | (2006.01) |

(52) U.S. Cl.
CPC ...... *B01D 17/0214* (2013.01); *B01D 17/0211* (2013.01); *B01D 21/003* (2013.01); *C02F 1/40* (2013.01); *E03F 5/16* (2013.01); *C02F 2101/32* (2013.01)

(58) Field of Classification Search
CPC ... E03F 5/16; B01D 17/0211; B01D 17/0214; B01D 21/003; C02F 1/40
USPC ..... 210/801, 521, 522, 532.1, 533, 538, 540
See application file for complete search history.

(56) References Cited

U.S. PATENT DOCUMENTS

| | | | | |
|---|---|---|---|---|
| 1,164,527 A | * | 12/1915 | Kelly ................ | B01D 17/0211 210/540 |
| 1,636,866 A | | 7/1927 | Kutzer | |
| 1,856,099 A | | 5/1932 | Hertsch | |
| 2,057,203 A | | 10/1936 | Payzer et al. | |
| 2,284,737 A | * | 6/1942 | Hirshstein ................ | E03F 5/16 210/540 |
| 2,564,172 A | | 8/1951 | Raaberg et al. | |
| 2,782,929 A | * | 2/1957 | Colket ............... | B01D 17/0211 210/540 |
| 3,144,408 A | * | 8/1964 | Pascual ................... | E03C 1/264 210/538 |
| 3,933,654 A | * | 1/1976 | Middelbeek ........ | B01D 17/0211 210/521 |
| 4,268,392 A | * | 5/1981 | Hayes ..................... | E03C 1/264 210/532.1 |
| 4,396,508 A | * | 8/1983 | Broughton ......... | B01D 17/0211 210/522 |
| 4,422,931 A | * | 12/1983 | Wolde-Michael ......................... | B01D 17/0214 210/540 |
| 4,917,311 A | | 4/1990 | Yoshino et al. | |

(Continued)

FOREIGN PATENT DOCUMENTS

| | | |
|---|---|---|
| CN | 1254655 C | 5/2006 |
| CN | 207192858 U | 4/2018 |

(Continued)

*Primary Examiner* — Christopher Upton
(74) *Attorney, Agent, or Firm* — Carter, DeLuca & Farrell LLP; George Likourezos

(57) ABSTRACT

A fluid waste filtration system includes a housing configured to be coupled between and in fluid communication with a sink and a primary grease trap. The housing defines a chamber and includes a fluid inlet, a fluid outlet, and a grease outlet each in fluid communication with the chamber. The grease outlet is defined in a plane at or above a plane of the fluid outlet. A wall is disposed in the housing and divides the chamber into a first chamber and a second chamber. The wall is configured to direct a fluid that flows into the first chamber through the fluid inlet toward the grease outlet.

19 Claims, 4 Drawing Sheets

(56) References Cited

U.S. PATENT DOCUMENTS

| | | | | | |
|---|---|---|---|---|---|
| 5,505,860 | A | * | 4/1996 | Sager | E03F 5/16 |
| | | | | | 210/521 |
| 5,993,646 | A | * | 11/1999 | Powers | E03F 5/16 |
| | | | | | 210/538 |
| 7,297,284 | B2 | * | 11/2007 | Owen | B01D 17/0211 |
| | | | | | 210/540 |
| 7,300,588 | B2 | * | 11/2007 | Breeders | E03F 5/16 |
| | | | | | 210/801 |
| 8,298,417 | B2 | | 10/2012 | Lemay et al. | |
| 10,464,829 | B2 | | 11/2019 | Sit | |

FOREIGN PATENT DOCUMENTS

| | | | |
|---|---|---|---|
| CN | 208104056 | U | 11/2018 |
| JP | 3275721 | B2 | 4/2002 |
| JP | 3689082 | B2 | 8/2005 |
| JP | 3738132 | B2 | 1/2006 |
| JP | 2006336245 | A | 12/2006 |
| JP | 2007130552 | A | 5/2007 |
| JP | 4348305 | B2 | 10/2009 |
| JP | 2010201321 | A | 9/2010 |
| JP | 2010275824 | A | 12/2010 |
| JP | 4771058 | B2 | 9/2011 |
| JP | 5938431 | B2 | 6/2016 |
| JP | 2020059992 | A | 4/2020 |
| KR | 200250155 | Y1 | 11/2001 |
| KR | 200379869 | Y1 | 3/2005 |
| KR | 200438021 | Y1 | 1/2008 |
| KR | 10-2015-0096630 | A | 8/2015 |
| RU | 2432321 | C1 | 10/2011 |
| RU | 143811 | U1 | 7/2014 |

\* cited by examiner

400 ⇘

410 — Positioning an auxiliary fluid waste filtration system between a sink and a primary grease trap 420 — Fluidly coupling a fluid inlet of the auxiliary grease trap with a sink 430 — Fluidly coupling a fluid outlet of the auxiliary grease trap with the primary grease trap

FLUID WASTE FILTRATION SYSTEM WITH GREASE AND GARBAGE TRAPS

TECHNICAL FIELD

This disclosure relates to wastewater filtration systems, and, specifically, to a miniature wastewater filtration system with grease and garbage traps for use under a sink.

BACKGROUND

Wastewater or other fluids, including cooking oil, grease, and other food waste is often poured down a drain. Oil and grease can harden inside the pipes of a building before it reaches a sewer system often causing backups and foul odors, often around sinks in a kitchen, bathroom, or elsewhere. Conventional grease traps for catching cooking oil, grease, and other garbage are often too large to be placed under a sink and are cleaned only a few times a year.

Accordingly, there is a continuing need to provide a convenient and effective means for filtering grease and garbage from wastewater or other food related waste to prevent clogged pipes, backups, and foul odors.

SUMMARY

In one aspect, in accordance with the principles of the present disclosure, a fluid waste filtration system includes a housing configured to be coupled between and in fluid communication with a sink and a primary grease trap. The housing defines a chamber and includes a fluid inlet, a fluid outlet, and a grease outlet each in fluid communication with the chamber. The grease outlet is defined in a plane at or above a plane of the fluid outlet. A wall is disposed in the housing and dividing the chamber into a first chamber and a second chamber. The wall is configured to direct a fluid that flows into the first chamber through the fluid inlet toward the grease outlet.

In aspects, the housing may include a bottom defining a waste outlet.

In aspects, the fluid outlet may be in the second chamber and the waste outlet and the grease outlet may be in the first chamber.

In aspects, the system may further include a valve in fluid communication with the fluid inlet. The valve is configured to couple the housing to a sink flange and may be transitionable between a first configuration and a second configuration. When the valve is in the first configuration, the valve is configured to direct fluid that flows into the housing into the first chamber, and when the valve is in the second configuration, the valve is configured to direct fluid that flows into the housing into the second chamber.

In aspects, the fluid inlet may be divided by a top end of the wall and positioned above and in overlapping alignment with the fluid outlet.

In aspects, the wall may have a bottom end that is positioned above and in overlapping alignment with the waste outlet.

In aspects, the fluid waste filtration system may further include a pipe having a first end positioned in the second chamber and defining the fluid outlet, and a second end configured to be fluidly coupled to the primary grease trap.

In aspects, the fluid inlet may be configured to couple to a sink flange of a sink.

In aspects, the wall may extend obliquely from a top of the housing to a bottom of the housing between the fluid inlet and the fluid outlet such that the wall is configured to prevent the fluid from flowing directly from the fluid inlet into the fluid outlet.

In aspects, the fluid waste filtration system may further include a grease container configured to be removably coupled to the housing. The grease container is in fluid communication with the grease outlet when the grease container is coupled to the housing.

In aspects, the housing further may include a waste outlet defined by a bottom of the housing and in fluid communication with a waste container.

In aspects, the wall defines an opening adjacent the bottom of the housing to enable fluid to flow from the first chamber to the second chamber.

In aspects, the fluid waste filtration system may further include a baffle disposed adjacent the wall defining a gap therebetween. The baffle is configured to control a rate of flow of the fluid that flows into the housing and is configured to slow the rate of flow of the fluid to allow grease mixed in the fluid to separate from the fluid.

In accordance with further aspects of the present disclosure, an auxiliary grease trap configured to be positioned between a primary grease trap and a sink includes a housing, a plate, an inlet, a grease container and a drain pipe. The housing defines a chamber, and a plate is positioned in the housing and separates the chamber into a first housing section and a second housing section. The inlet is coupled to the housing and is configured to couple to a drain of a sink. The inlet is configured to facilitate fluid communication between the housing and a sink. The grease container is removably coupled to the first housing section and is open to a first level in the housing. The drain pipe extends through the second housing section to enable fluid to exit the housing. The drain pipe is open to a second level in the housing that is below the first level.

In aspects, a garbage container may be removably coupled to a bottom of the housing. The bottom of the housing may be configured to encourage solid waste to enter the garbage container.

In aspects, the plate may be curved. The housing may include a baffle extending from a top of the housing towards a bottom portion of the plate, the baffle spaced apart from the bottom portion of the plate to define a gap therebetween to enable fluid to flow through the gap.

In aspects, the baffle may extend below the first level. The baffle is configured to urge grease separated from fluid in the housing toward the grease container.

In aspects, the auxiliary grease trap may further include a valve in fluid communication with the inlet, the valve transitionable between a first configuration and a second configuration, wherein, when in the first configuration, the valve is configured to direct fluid that flows into the housing to the first housing section and when in the second configuration the valve is configured to direct fluid that flows into the housing to the second housing section.

This disclosure provides in yet further aspects a method for pre-filtering grease from a fluid flowing from a sink. The method includes positioning an auxiliary grease trap between a sink and a primary grease trap. The auxiliary grease trap includes a housing divided by a wall thereby defining a first chamber and a second chamber in fluid communication with each other. The auxiliary grease trap has a grease outlet in fluid communication with the first chamber. The method further includes fluidly coupling a fluid inlet of the auxiliary grease trap with a sink, and fluidly coupling a fluid outlet of the auxiliary grease trap with the primary grease trap.

As used herein, the terms parallel and perpendicular are understood to include relative configurations that are substantially parallel and substantially perpendicular up to about + or −15 degrees from true parallel and true perpendicular.

As used herein, terms including "generally," "about," "substantially," and the like, as utilized herein, are meant to encompass variations, e.g., manufacturing tolerances, material tolerances, use and environmental tolerances, measurement variations, and/or other variations, up to and including plus or minus 10 percent.

As used herein, the term "grease" refers to food or cooking related grease, oils, and other similar substances that are less dense than water.

BRIEF DESCRIPTION OF THE DRAWINGS

The present disclosure will become more readily apparent from the specific description accompanied by the following drawings, in which.

DETAILED DESCRIPTION

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "top" and "bottom" are relative and used only in the context to the other, and are not necessarily "superior" and "inferior."

The present disclosure generally provides an auxiliary fluid waste filtration system that filters at least a portion of grease and solid waste from a fluid that is poured into a sink or other drainage basin (e.g., from a dishwasher). The auxiliary fluid waste filtration system enables a person to remove some of the grease and/or solid waste (e.g., food scraps) after it is poured into a sink and before it enters into a plumbing system of a home or a primary grease trap of an industrial building (e.g., a restaurant). The grease or solid waste is collected in at least one container that a person can easily disconnect so as to be able to dispose of the grease or solid waste collected in the container.

Figure 1:
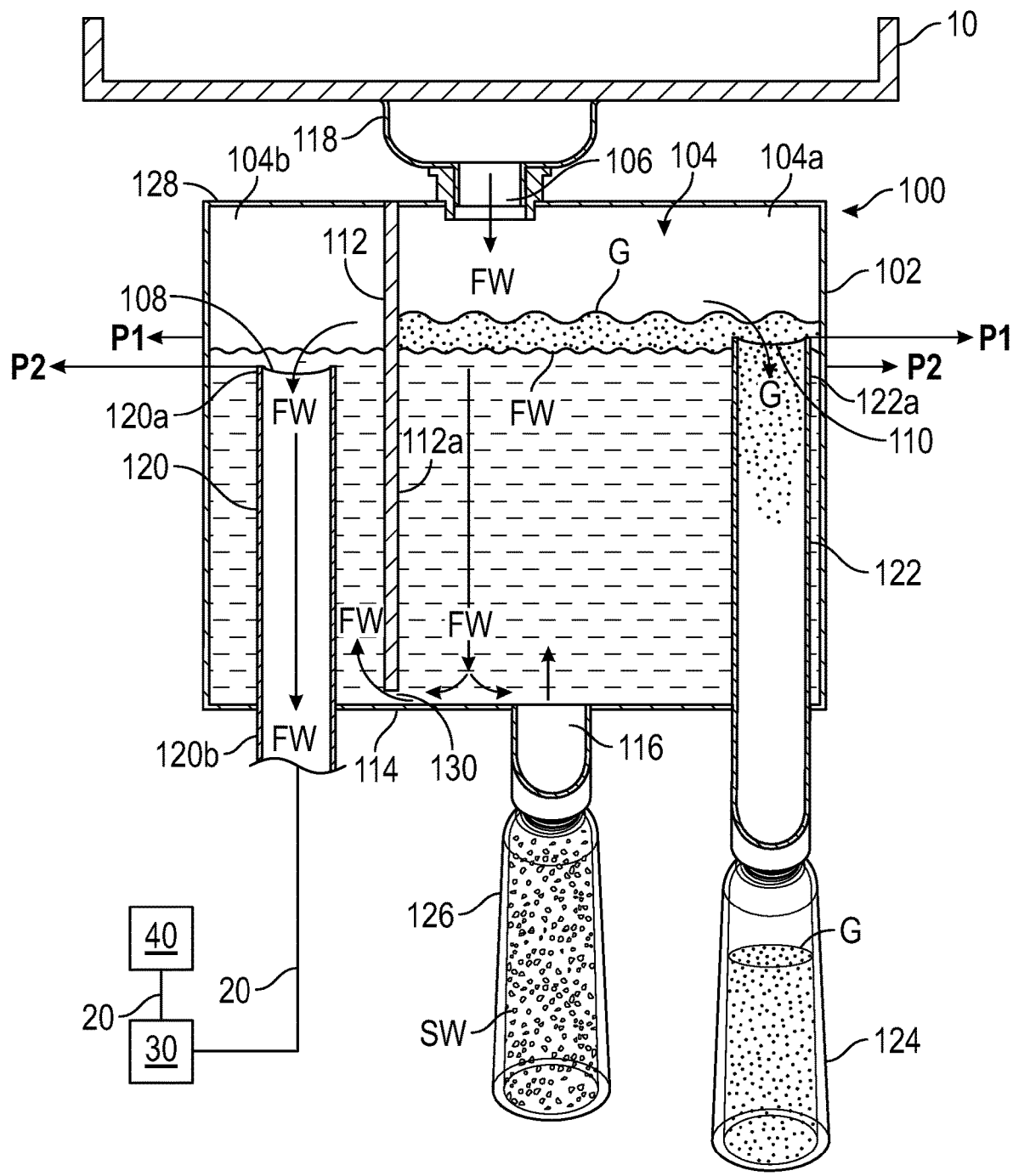
FIG. 1 is a diagram of an auxiliary fluid waste filtration system, in accordance with aspects of this disclosure.

With reference to FIG. 1, an auxiliary fluid waste filtration system 100 generally includes a housing 102 defining a chamber 104. The housing has a fluid inlet 106, a fluid outlet 108, and a grease outlet 110 each in fluid communication with the chamber 104. The housing 102 is configured to be coupled between and in fluid communication with a sink 10 and a primary grease trap 30. The chamber 104 of the housing 102 is divided into a first chamber 104a and a second chamber 104b by a plate or wall 112 disposed in the housing 102. In aspects, the housing 102 includes a bottom 114 defining a waste outlet 116 positioned between the fluid outlet 108 and the grease outlet 110. The fluid inlet 106, the grease outlet 110, and the waste outlet 116 are disposed in the first chamber 104a and the fluid outlet 108 is disposed in the second chamber 104b.

The housing 102 may define a volume from about a quarter of a gallon to about 5 gallons. In aspects, the housing 102 may define a volume from about 1 gallon to about 2 gallons. The housing 102 may define any suitable volume (e.g., 1 gallon or greater than 5 gallons) such that the housing 102 may be placed below a commercial or residential sink 10 (e.g., in a cabinet below a residential sink) or below a drain of a dishwasher.

The fluid inlet 106 is configured to couple to a sink flange 118 of the sink 10. The housing 102 may be directly coupled to the sink flange 118 such that fluid waste poured into the sink 10 drains into the housing 102 through the fluid inlet 106. The auxiliary fluid waste filtration system 100 may further include a pipe 120 disposed in the second chamber 104b. The pipe 120 includes a first end 120a defining the fluid outlet 108 and a second end 120b configured to be fluidly coupled to a primary grease trap 30 via plumbing system 20 that is in fluid communication with the primary grease trap 30. The pipe 120 may extend out of the housing 102 or may terminate at the bottom 114 of the housing 102. The primary grease trap 30 is in fluid communication with the plumbing system 20 and a municipal sewage system 40.

Figure 2A:
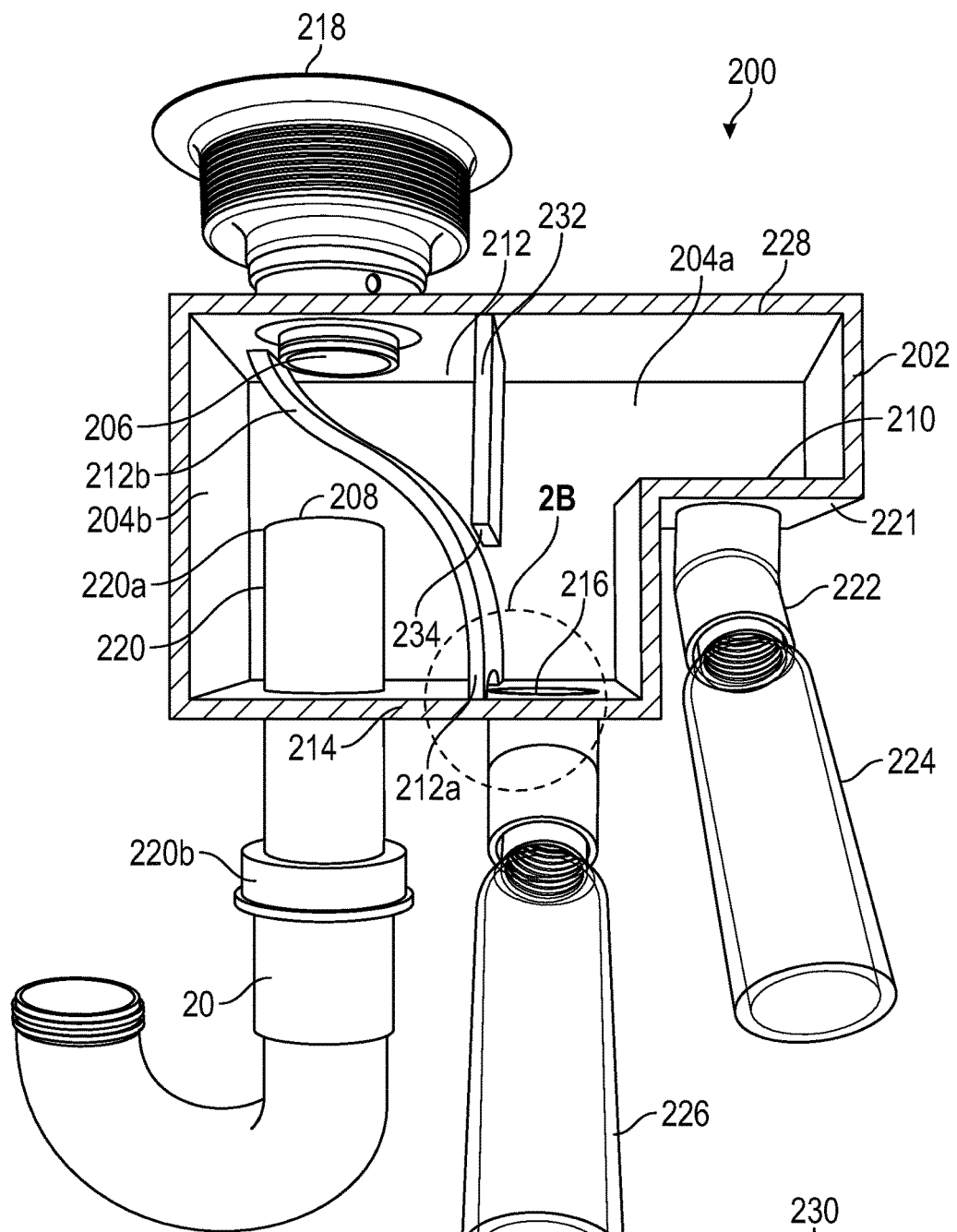
FIG. 2A is a front view of another auxiliary fluid waste filtration system, in accordance with another aspect of this disclosure.

The grease outlet 110 may be defined by the housing 102 or by an end 122a of a grease drain pipe 122 disposed in the first chamber 104a of the housing 102. For example, the housing 102 may have a stepped bottom 221 (FIG. 2) such that the grease outlet 110 is defined by the stepped bottom 221 (e.g., as shown in FIG. 2A). The grease outlet 110 is in fluid communication with a grease container 124. The grease container 124 may be removably coupled to the housing 102 (e.g., via a screw socket mechanism) or to the grease drain pipe 122. In aspects, the grease outlet 110 may be in fluid communication with a bucket placed below the grease outlet 110. In aspects, the grease container 124 (e.g., a bottle) may be removably coupled to an auto-sealing valve (not shown), such that, when the grease container 124 is removed, the auto-sealing valve transitions from an open configuration to a closed configuration to inhibit fluid waste or grease from spilling out of the auxiliary fluid waste filtration system 100. When the grease container 124 is inserted back into the auto-sealing valve, the auto-sealing valve transitions to an open configuration to permit fluid communication between the grease container 124 and the first chamber 104a via the grease outlet 110. In aspects, the grease outlet 110 may be in fluid communication with the grease container 124 via a hose or other fluid conduit. The hose or other fluid conduit may be removably coupled to the grease container 124.

The waste outlet 116 is in fluid communication with a waste container 126 (e.g., a bottle). The waste container 126 is removably coupled to the housing 102 (e.g., via a screw and socket mechanism) or to a waste pipe (not shown) extending from the waste outlet 116 and the housing 102. In aspects, the grease container 124 may be removably coupled to an auto-sealing valve (not shown), such that when the waste container 126 is removed, the auto-sealing valve transitions from an open configuration to a closed configuration to inhibit fluid waste or solid waste from spilling out of the auxiliary fluid waste filtration system 100. When the waste container 126 is inserted back into the auto-sealing valve, the auto-sealing valve transitions to an open configuration to permit fluid communication between the waste container 126 and the grease outlet 110. In aspects, the waste outlet 116 may be in fluid communication with the waste container 126 via a hose or other fluid conduit. The hose or other fluid conduit may be removably coupled to the waste container 126.

In aspects, the bottom 114 may be sloped such that the waste outlet 116 is at a lowest most level of the bottom 114 and is thus configured to encourage solid waste to enter the waste container 126. In such aspects, solid waste is encouraged towards the waste outlet 116 so that the solid waste does not settle within the first chamber 104a of the housing 102.

Figure 2B:
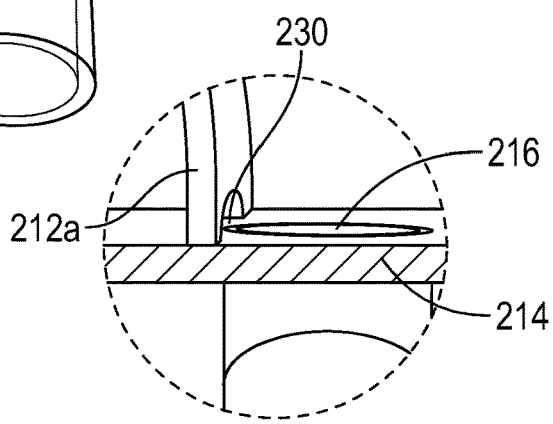
FIG. 2B is a detailed, side view of the encircled area of FIG. 2A, in accordance with another aspect of this disclosure.

The wall 112 extends from a top 128 of the housing 102 toward the bottom 114 of the housing. The wall 112 has a bottom end 112a that may terminate adjacent the bottom 114 of the housing so as to define a gap 130 therebetween to enable fluid waste to flow between the first chamber 104a and the second chamber 104b. Alternately, as shown in FIG. 2B, the bottom end 112a of the wall 112 may touch the bottom 114, and the bottom end 112a of the wall 112 defines an arched opening 130 through a thickness thereof (FIG. 2B) to enable fluid waste to flow between the first chamber 104a and the second chamber 104b.

The grease outlet 110 is coplanar with a first plane $P_1$ or first level in the housing 102, and the fluid outlet 108 is coplanar with a second plane $P_2$ or second level in the housing 102. The first plane P1 is positioned at or above the second plane P2. In aspects, the grease outlet 110 is open at the first plane P1 in the housing 102 just above the second plane P2 in the housing 102, and the fluid outlet 108 is open at the second plane P2 in the housing 102 just below the first plane P1 in the housing 102. The grease outlet 110 is thus configured to drain grease that rises above water of fluid waste flowing into the auxiliary fluid waste filtration system 100 and the fluid outlet 108 is configured to drain the remaining waste fluid out of the auxiliary fluid waste filtration system 100. The first plane $P_1$ and the second plane $P_2$ are at a height in the housing 102 sufficient to permit at least a portion of grease or other substances less dense than water to float to the top of waste fluid flowing into the auxiliary fluid waste filtration system 100.

In operation, as fluid waste (indicated by "FW") enters the auxiliary fluid waste filtration system 100 via the fluid inlet 106, the fluid waste "FW" flows first down to the bottom of the housing 102 and beings to fill up the first and second chambers 104a, 104b. Solid waste (indicated by "SW") that is denser than the fluid and grease contained in the fluid waste "FW" sinks towards the waste outlet 116 where it is collected by the waste container 126. As the fluid waste "FW" fills the housing 102, the grease (indicated by "G") separates and floats to the top of the fluid waste "FW." Upon the level of the fluid waste "FW" rising above the bottom end 112a of the wall 112, the grease "G" of any fluid waste "FW" that continues to flow into the first chamber 104a via the fluid inlet 106 will remain only in the first chamber 104a because the wall 112 prohibits the grease "G" from any subsequent inflowing fluid waste "FW" from passing from the first chamber 104a into the second chamber 104b. That is, the only grease "G" that passes into the second chamber 104b is the grease "G" from the initial fluid waste "FW" that entered the chamber 104. Due to the grease outlet 110 being at or slightly above the fluid outlet 108, as the level of the fluid waste "FW" in the chambers 104a, 104b reaches the grease outlet 110 and the fluid outlet 108, respectively, only the grease "G" or other substances less dense than water will drain through the grease outlet 110 and into the grease container 124. At the same time, the remaining fluid waste "FW" which is below the floating grease "G" drains out of the housing 102 through the fluid outlet 108.

In aspects, the wall 112 is positioned adjacent the fluid outlet 108 (e.g., closer to the fluid outlet 108 than to the grease outlet 110) such that the first chamber 104a is larger by volume than the second chamber 104b. In such aspects, the wall 112 enables more grease to collect in the first chamber 104a than in the second chamber 104b, and thus more grease to flow out of the housing 102 through the grease outlet 110. Additionally, the gap 130 defined between the wall 112 and the bottom 114 of the housing (or by the bottom end 112a of the wall) promotes mostly water of the fluid waste to flow from the first chamber 104a to the second chamber 104b. Once the level of fluid waste in the housing 102 rises above the gap 130, grease flowing into the second chamber 104b will be minimized as the grease is naturally inclined to float above the water of the fluid waste in the first chamber 104a and thus above the gap 130.

When the grease container 124 or the waste container 126 are full, the grease container 124 or waste container 126 can be removed by a person so as to dispose of the collected grease or waste. If the level of fluid waste in the housing 102 is below the fluid outlet 108, if desired, the remaining fluid may be drained by opening a faucet of the sink 10 such that water flows from the faucet into the sink and enters the housing 102. Alternatively, the waste container 126 may be repeatedly removed to drain the remaining fluid waste. The collected grease and/or waste may be recycled, for example, as a compost fertilizer. By prefiltering the fluid waste with the auxiliary fluid waste filtration system 100, less grease and waste will flow through a building's plumbing system and into a primary grease trap, thus minimizing maintenance and cleanup of the plumbing system or the primary grease trap.

With reference to FIGS. 2A-B, another auxiliary fluid waste filtration system 200 is shown. The auxiliary fluid waste filtration system 200 is substantially the same as and includes the features of the auxiliary fluid waste filtration system 100, and for the sake of brevity, only the differences will be discussed.

The auxiliary fluid waste filtration system 200 includes a wall 212 that is configured to direct a fluid that flows into the first chamber 204a through the fluid inlet 206 toward the grease outlet 210. The wall 212 is configured to extend obliquely from a top 228 of the housing 202 to the bottom 214 of the housing 202 between the fluid inlet 206 and the fluid outlet 208 such that the wall 212 may prevent fluid waste from flowing directly from the fluid inlet 206 into the fluid outlet 208. In aspects, the fluid inlet 206 and the fluid outlet 208 are in overlapping alignment. The wall 212 may be curved, e.g., undulating, such that an upper portion 212*b* of the wall 212 is above the fluid outlet 208 and a lower portion 212*b* of the wall 212 terminates at the bottom 214 of the housing 202 adjacent the waste outlet 216. By terminating adjacent the waste outlet 216, the wall 212 is configured to direct solid waste into the waste container 226.

The housing 202 has a baffle 232 that extends from the top 228 of the housing 202 towards the lower portion 212*a* of the wall 212. The baffle 232 is spaced apart from the lower portion 212*a* of the wall 212 to define a second gap 234 therebetween. The second gap 234 enables fluid to flow therethrough. The second gap 234 is configured to slow the rate of fluid waste flowing through the second gap 234 and into the first chamber 204*a* and towards the waste outlet 216 and the grease outlet 210. By slowing the rate of fluid waste flowing through the second gap 234, grease and oil in the fluid waste are provided more time to float to the top surface of the fluid waste in the housing 202. The baffle 232 is configured to reduce turbulence of the fluid waste flowing into the housing 202.

In aspects, the baffle 232 may be configured to extend below the first plane or the second plane of the grease outlet 210 and the fluid outlet 208, respectively. The baffle 232 is configured to urge grease collected in the housing 202 and floating on the surface of the fluid waste in the housing 202 toward the grease outlet 210. As shown in FIG. 2A, the grease container 224 is coupled to a stepped portion 221 of the bottom 214 of the housing 202. The stepped portion 221 terminates in the first plane in which the grease outlet 210 is defined.

In aspects, the grease container 224 and/or the waste container 226 are bottles coupled to the housing 202. The grease container 224 and/or the waste container 226 may be coupled to the housing 202 at an angle such that a total height of the auxiliary fluid waste filtration system 200 is reduced, thus enabling an easier fit of the auxiliary fluid waste filtration system 200 below a sink 10. The grease container 224 or waste container 226 may be any suitable shape or size and configured based on the needs of a user.

In use, the auxiliary fluid waste filtration system 200 operates substantially the same as the auxiliary fluid waste filtration system 100. The lower portion 212*b* of the wall 212 of the auxiliary fluid waste filtration system 200 is adjacent the waste outlet 216 to further maintain the grease or oil in the first chamber 204*a*.

Figure 3A:
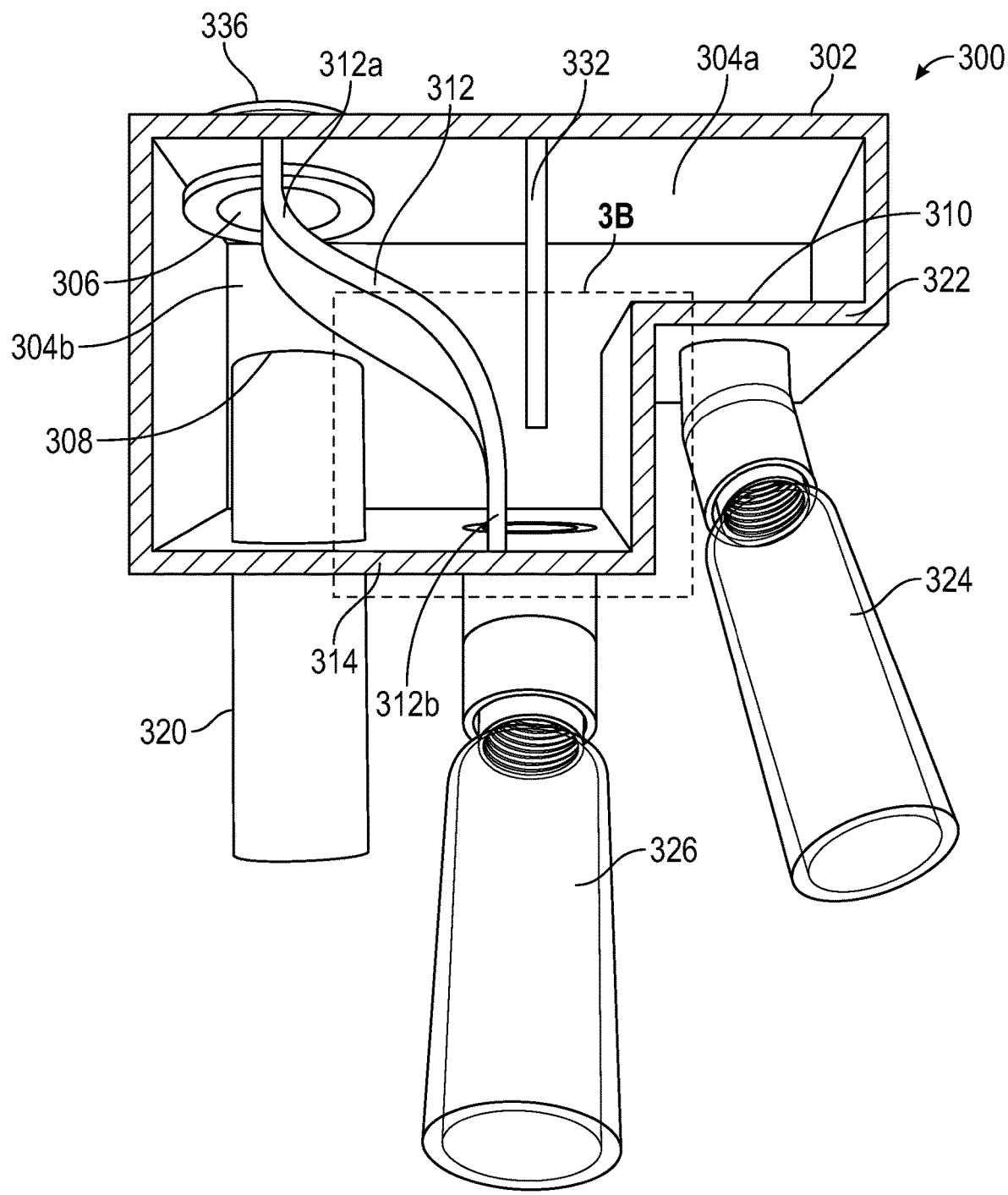
FIG. 3A is a front view of yet another auxiliary fluid waste filtration system, in accordance with further aspects of this disclosure.
Figures 3B, 4:
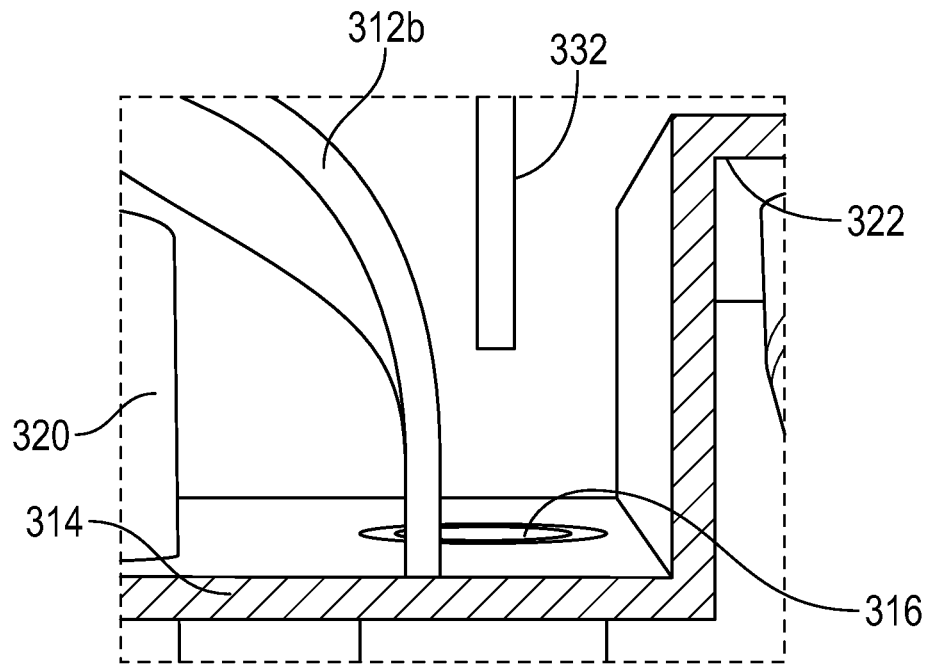
FIG. 3B is a detailed view of the encircled area of FIG. 3B illustrating a solid waste outlet, in accordance with aspects of this disclosure.
FIG. 4 is a diagram of a method for pre-filtering grease from a fluid flowing from a sink.

With reference to FIGS. 3A-3B, an auxiliary fluid waste filtration system 300 is shown. The auxiliary fluid waste filtration system 300 is similar to the auxiliary fluid waste filtration systems 100 and 200 described above, and for brevity, only the differences will be detailed below.

The fluid inlet 306 is divided by a top portion 312*a* of the wall 312 (FIG. 3A). The wall 312, similar to wall 212, extends obliquely from the top of the housing 302 to the bottom 314 of the housing 302. In aspects, a bottom portion 312*b* of the wall 312 is suspended above the waste outlet 316 to divide the waste outlet 116 (FIG. 3B) into an inflow opening that is positioned in the first chamber 304*a* and an overflow opening positioned in the second chamber 304*b*.

The fluid inlet 306 of the auxiliary fluid waste filtration system 300 is in fluid communication with a valve 336. The valve 336 is configured to couple the housing 302 to the sink flange 118 (FIG. 1) to enable fluid communication between the sink 10 and the auxiliary fluid waste filtration system 300. The valve 336 is transitionable between a first configuration and second configuration. When in the first configuration, the valve 336 is configured to direct fluid waste into the first chamber 104*a* of the housing 302. When in the second configuration, the valve 336 is configured to direct fluid into the second chamber 104*b*, bypassing the first chamber 304*a*. Thus, the valve 336 enables a user to enable fluid waste to flow directly into the fluid outlet 308 if the user desires not to pre-filter the fluid waste. For example, if the user is unable (either at that time or for another reason) to remove the waste container 326 or grease container 324, the user may transition the valve 336 to the second configuration such that the fluid waste drains directly into the second chamber. In aspects, the fluid outlet 308 is in overlapping alignment with the fluid inlet 306, such that when the valve 336 is in the second configuration, fluid waste flows directly from the fluid inlet 306 into the fluid outlet 308.

In aspects, the fluid inlet 306 is configured to couple to the sink flange 318 to enable fluid communication between the sink 10 and the auxiliary fluid waste filtration system 300.

With reference to FIG. 4, a method 400 for pre-filtering grease from a fluid flowing from a sink 10 (FIG. 1) using a fluid waste filtration system (e.g., one of fluid waste filtration systems 100, 200, or 300) of this disclosure is illustrated. At operation 410, the method includes positioning the auxiliary fluid waste filtration system (e.g., 100) between the sink 10 and a primary grease trap 30. At operation 420, the method includes fluidly coupling the fluid inlet 106 of the auxiliary fluid waste filtration system (e.g., 100) with the sink 10. At operation 430, the method includes fluidly coupling the fluid outlet 108 of the auxiliary fluid waste filtration system 100 with the primary grease trap 30.

It will be understood that various modifications may be made to the embodiments disclosed herein. Aspects of one of the auxiliary fluid waste filtration systems (e.g., 100, 200, or 300) may be combined with another of the auxiliary fluid waste filtration systems without departing from the scope of this disclosure. Therefore, the above description should not be construed as limiting, but merely as exemplification of the various embodiments. Those skilled in the art will envision other modifications within the scope and spirit of the claims appended hereto.

What is claimed is:

1. A fluid waste filtration system comprising:
   a housing configured to be coupled between and in fluid communication with a sink and a primary grease trap, the housing defining a chamber and including a fluid inlet, a fluid outlet, and a grease outlet each in fluid communication with the chamber, wherein the grease outlet is defined in a plane at or above a plane of the fluid outlet;
   a wall disposed in the housing and dividing the chamber into a first chamber and a second chamber, the wall being configured to direct a fluid that flows into the first chamber through the fluid inlet toward the grease outlet; and
   a grease container configured to be removably coupled to a bottom of the housing and in fluid communication with the grease outlet when the grease container is coupled to the housing.

2. The fluid waste filtration system of claim 1, wherein the bottom of the housing defines a waste outlet, the fluid waste filtration system further comprising a waste container positioned below the housing and removably coupled to and in fluid communication with the waste outlet.

3. The fluid waste filtration system of claim 2, wherein the fluid outlet is in the second chamber and the waste outlet and the grease outlet are in the first chamber.

4. The fluid waste filtration system of claim 3, further comprising a valve in fluid communication with the fluid inlet, the valve configured to couple the housing to a sink flange and transitionable between a first configuration and a second configuration, wherein, when in the first configuration the valve is configured to direct fluid that flows into the housing into the first chamber and when in the second configuration the valve is configured to direct fluid that flows into the housing into the second chamber.

5. The fluid waste filtration system of claim 4, wherein the fluid inlet is divided by a top end of the wall and positioned above and in overlapping alignment with the fluid outlet.

6. The fluid waste filtration system of claim 2, wherein the wall has a bottom end that is positioned above and in overlapping alignment with the waste outlet, the waste outlet being open on a first side of the wall and a second side of the wall.

7. The fluid waste filtration system of claim 2, wherein the wall defines an arcuate opening adjacent the bottom of the housing to enable fluid to flow from the first chamber to the second chamber.

8. The fluid waste filtration system of claim 2, wherein the waste container is a bottle having a threaded top configured to be screwed into the waste outlet.

9. The fluid waste filtration system of claim 1, further comprising a pipe having a first end positioned in the second chamber and defining the fluid outlet, and a second end configured to be fluidly coupled to the primary grease trap.

10. The fluid waste filtration system of claim 1, wherein the fluid inlet is configured to couple to a sink flange of a sink.

11. The fluid waste filtration system of claim 1, wherein the wall extends obliquely from a top of the housing to the bottom of the housing between the fluid inlet and the fluid outlet such that the wall is configured to prevent the fluid from flowing directly from the fluid inlet into the fluid outlet.

12. The fluid waste filtration system of claim 1, further comprising a baffle disposed adjacent the wall defining a gap therebetween and configured to control a rate of flow of the fluid that flows into the housing, the baffle configured to slow the rate of flow of the fluid to allow grease mixed in the fluid to separate from the fluid.

13. The fluid waste filtration system of claim 1, wherein the grease container is a bottle having a threaded top configured to be screwed into the grease outlet.

14. An auxiliary grease trap configured to be positioned between a primary grease trap and a sink, the auxiliary grease trap comprising:
   a housing defining a chamber therein;
   a plate positioned in the housing and separating the chamber into a first housing section and a second housing section;
   an inlet coupled to the housing and configured to couple to a drain of a sink, the inlet configured to facilitate fluid communication between the housing and a sink;
   a grease container removably coupled to the first housing section, the grease container open to a first level in the housing;
   a drain pipe extending through the second housing section to enable fluid to exit the housing, the drain pipe open to a second level in the housing that is below the first level; and
   a valve in fluid communication with the inlet, the valve being transitionable between a first configuration and a second configuration, wherein, when in the first configuration, the valve is configured to direct fluid that flows into the housing to the first housing section and when in the second configuration the valve is configured to direct fluid that flows into the housing to the second housing section.

15. The auxiliary grease trap of claim 14, further comprising a garbage container removably coupled to a bottom of the housing.

16. The auxiliary grease trap of claim 15, wherein the bottom of the housing is configured to encourage solid waste to enter the garbage container.

17. The auxiliary grease trap of claim 14, wherein the plate is curved, and the housing includes a baffle extending from a top of the housing towards a bottom portion of the plate, the baffle spaced apart from the bottom portion of the plate to define a gap therebetween to enable fluid to flow through the gap.

18. The auxiliary grease trap of claim 17, wherein the baffle extends below the first level and the baffle is configured to urge grease separated from fluid in the housing toward the grease container.

19. A method for pre-filtering grease from a fluid flowing from a sink, the method comprising:
   positioning an auxiliary grease trap between a sink and a primary grease trap, the auxiliary grease trap including a housing divided by a wall thereby defining a first chamber and a second chamber in fluid communication with each other, the auxiliary grease trap having a grease outlet in fluid communication with the first chamber, the auxiliary grease trap including a removable grease container coupled to the housing and in fluid communication with the grease outlet;
   fluidly coupling a fluid inlet of the auxiliary grease trap with a sink; and
   fluidly coupling a fluid outlet of the auxiliary grease trap with the primary grease trap.

\* \* \* \* \*